Nov. 4, 1969

W. C. TRETHEWEY 3,476,538

PROCESS AND APPARATUS FOR CONTROLLING THE FLOW OF
MOLTEN GLASS

Filed Oct. 24, 1965

INVENTOR.
WILLIAM C. TRETHEWEY
BY
Staelin & Overman
ATTORNEYS

Nov. 4, 1969                    W. C. TRETHEWEY                    3,476,538
           PROCESS AND APPARATUS FOR CONTROLLING THE FLOW OF
                              MOLTEN GLASS
Filed Oct. 24, 1965                                        5 Sheets-Sheet 4

INVENTOR.
WILLIAM C. TRETHEWEY
BY
Staelin & Overman
ATTORNEYS

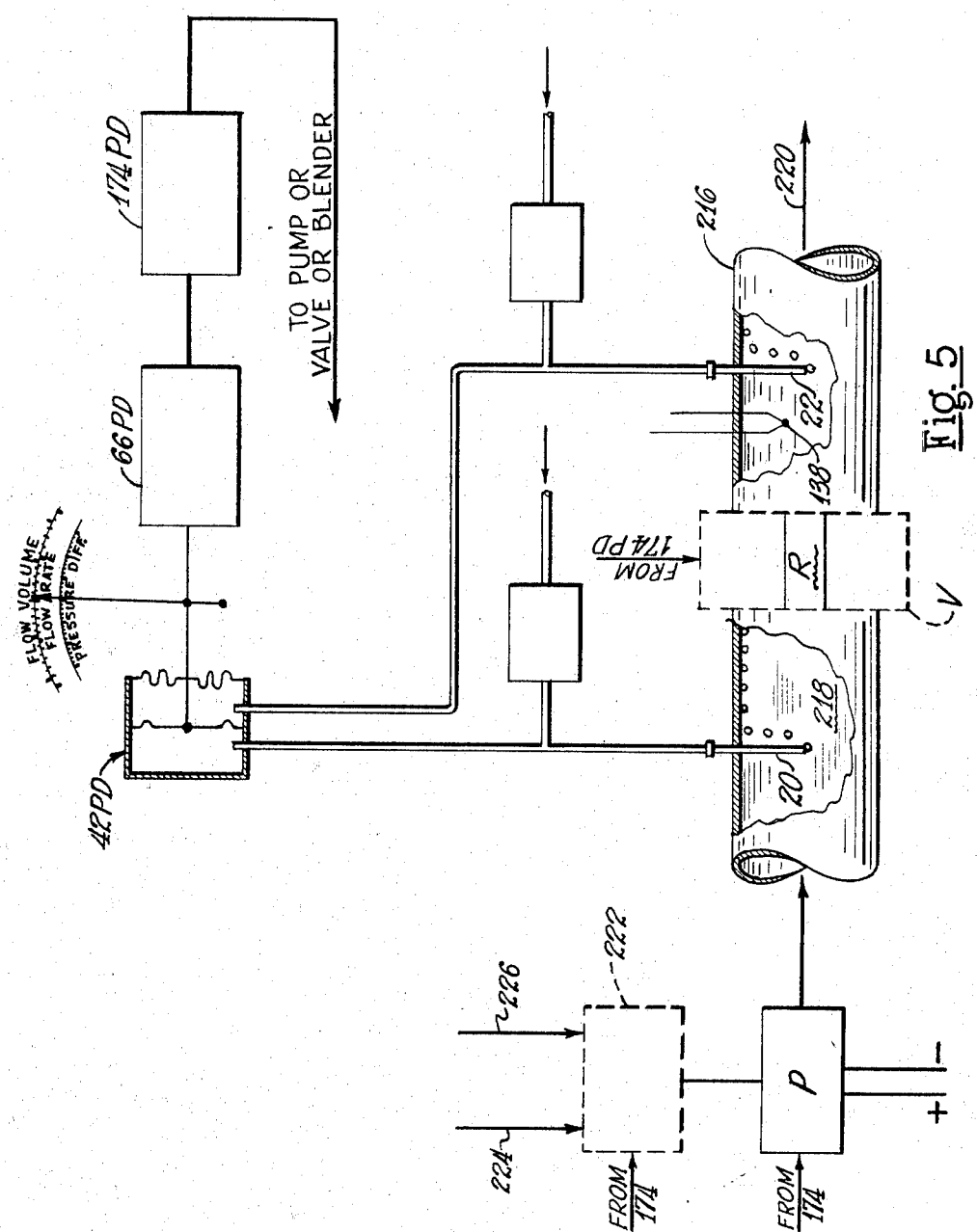

United States Patent Office 3,476,538
Patented Nov. 4, 1969

3,476,538
PROCESS AND APPARATUS FOR CONTROLLING THE FLOW OF MOLTEN GLASS
William C. Trethewey, Newark, Ohio, assignor to Owens-Corning Fiberglas Corporation, a corporation of Delaware
Filed Oct. 24, 1965, Ser. No. 504,847
Int. Cl. C03b 5/26
U.S. Cl. 65—29                                           7 Claims

ABSTRACT OF THE DISCLOSURE

Method and apparatus for controlling the flow of molten glass through a furnace wherein submerged bubbler probes on the high and low sides of the furnace provide a pressure drop signal, and the signal is used to maintain the level in the melter constant, and the outflow from the forehearth constant; composition and viscosity are also controlled within the scope of the invention.

---

Figure 1:
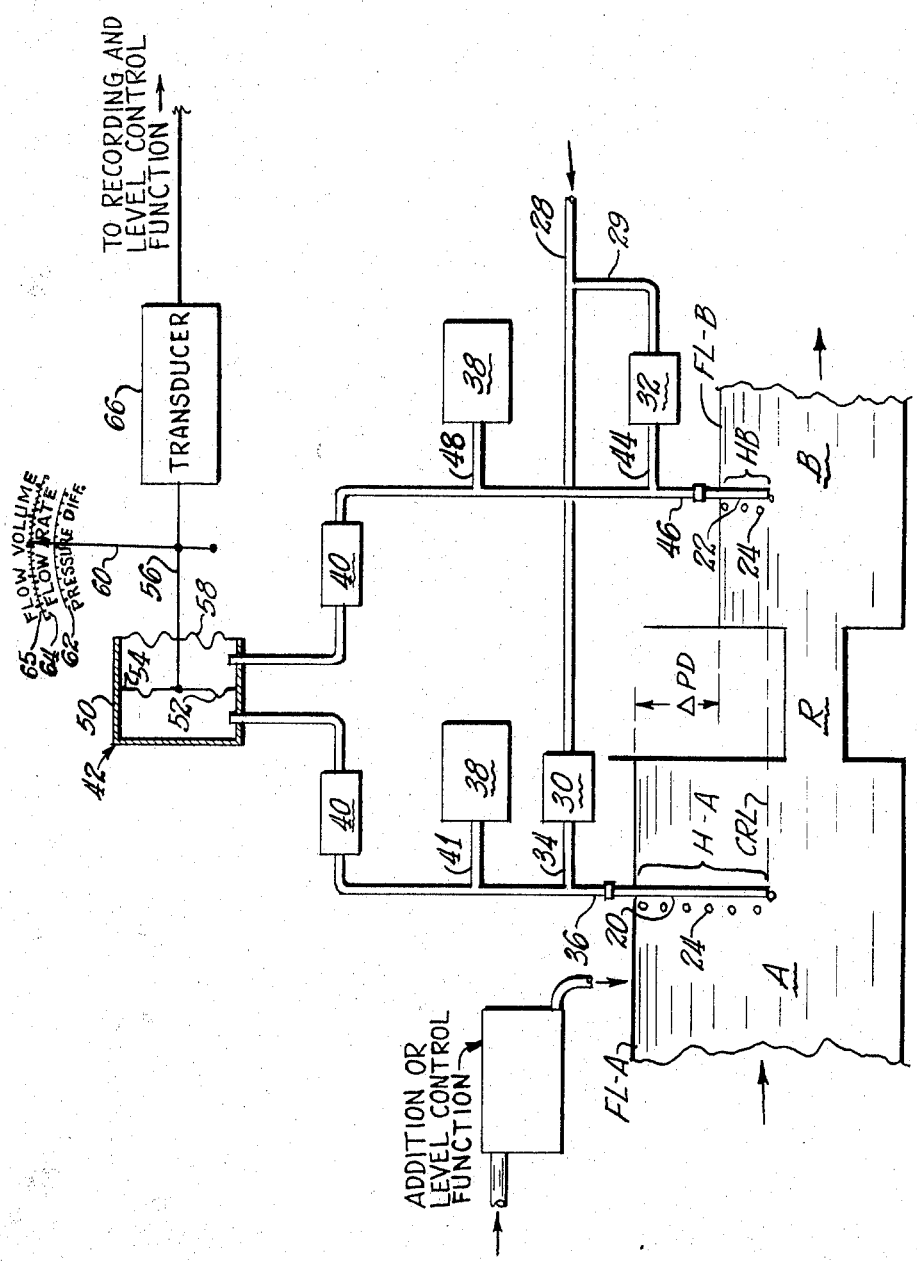

This invention relates to the processing of liquids, and more particularly to the processing of heat-softenable materials such as glass. Further, this invention relates to the measurement of flow of a liquid across a restriction to develop a pressure drop signal, and by means of the signal, to control level in the system. Still further this invention relates to the manipulation of liquids as by control of composition; control of temperature; control of viscosity and control of level.

The problem: Manufacture of glass on a continuous basis.—Melter life: In the production of molten glass it is desirable to maintain a substantially constant level in the glass melting furnace. One important reason for maintaining a constant level is to reduce the up and down washing action of the glass surface against the refractory furnace wall. The washing action erodes the refractory and causes refractory particles to fall into the melt. These contaminate the melt with "stones" and produce reject products.

Firing rate: Another reason for keeping the level constant is to keep firing rate constant and at optimum efficiency. When firing rates are varied to accommodate changes in the volume of infeed materials, problems arise from thermal gradients being produced in the glass. Thermal gradients cause non-uniform feed out of molten glass from the furnace.

It is a difficult task to keep level constant because molten glass is being constantly removed from the furnace; and it is necessary to add glass-forming materials to compensate for the glass removed. Under these conditions both the removal and addition require highly accurate control to hold the input and output and head at exact levels.

By the present invention an advance to the art is provided in the form of apparatus and process for precisely controlling flow in a glass melter.

Fixed outlet; temperature control.—A further important aspect of glass making is related to constant output of a forming bushing for optimum production. This has been impossible in the past because there has been no practical means of measuring rate of flow across the forehearth to the bushing. The present invention contributes an advance to the art by providing such, and in turn controlling the bushing temperature, or optionally, either the temperature of the forehearth or of the furnace itself.

Variable outlet.—Generally in the control of flow of liquids, an accurate means for setting a valve is desirable. The present invention provides such, based on pressure drop or rate of flow.

Composition control.—A further aspect of glass making relates to the control of composition and temperature. If it were possible to accurately govern these factors, the efficiency of forming, and the products produced would be greatly improved. The present invention provides process and apparatus for controlling composition and temperature of liquids such as glass, having temperature-sensitive viscosities.

It is accordingly an important object to provide process and apparatus for measuring flow of liquids.

A further object is to provide process and apparatus for controlling level of a glass melting furnace.

A further object is to provide process and apparatus for controlling temperature of glass in glass making operations.

A further object is to provide process and apparatus for controlling viscosity of molten glass.

A still further object is to provide process and apparatus for controlling composition of glass.

Figure 2:
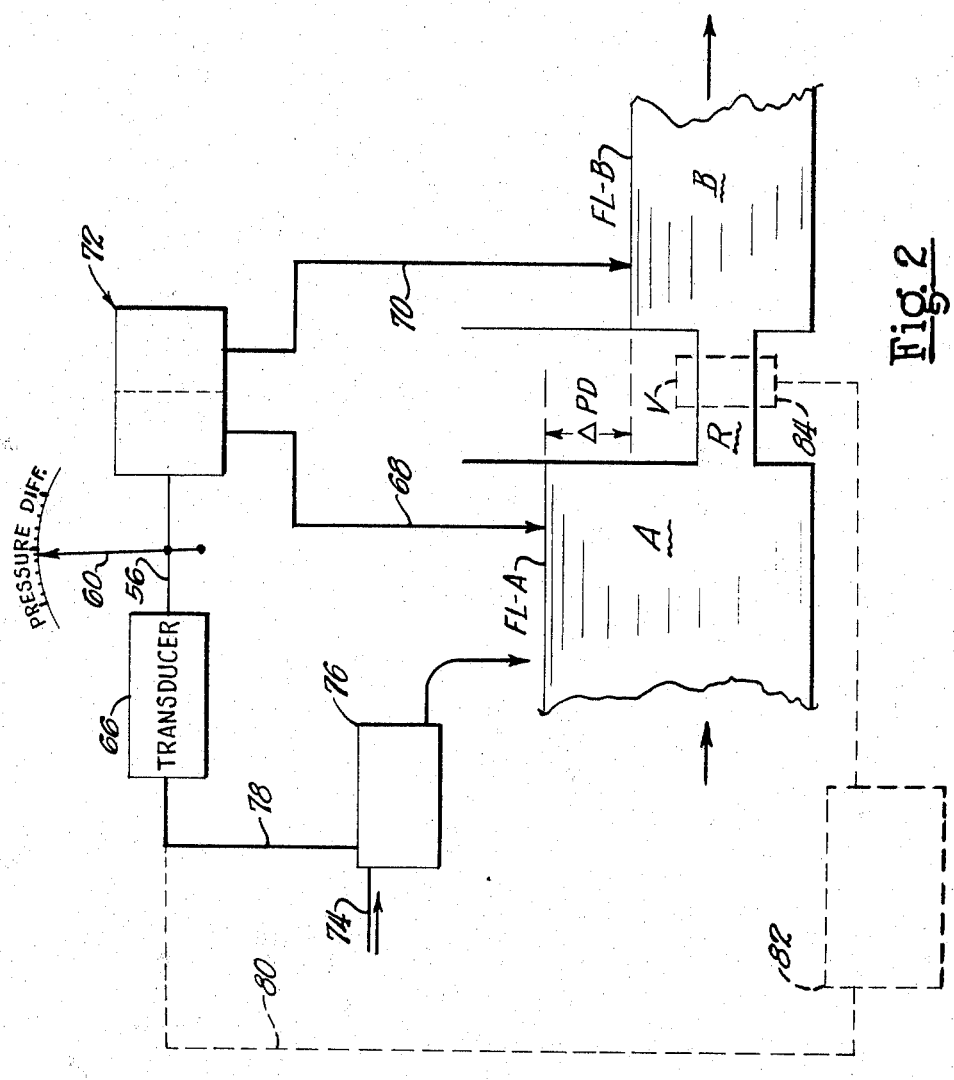
Figure 3:
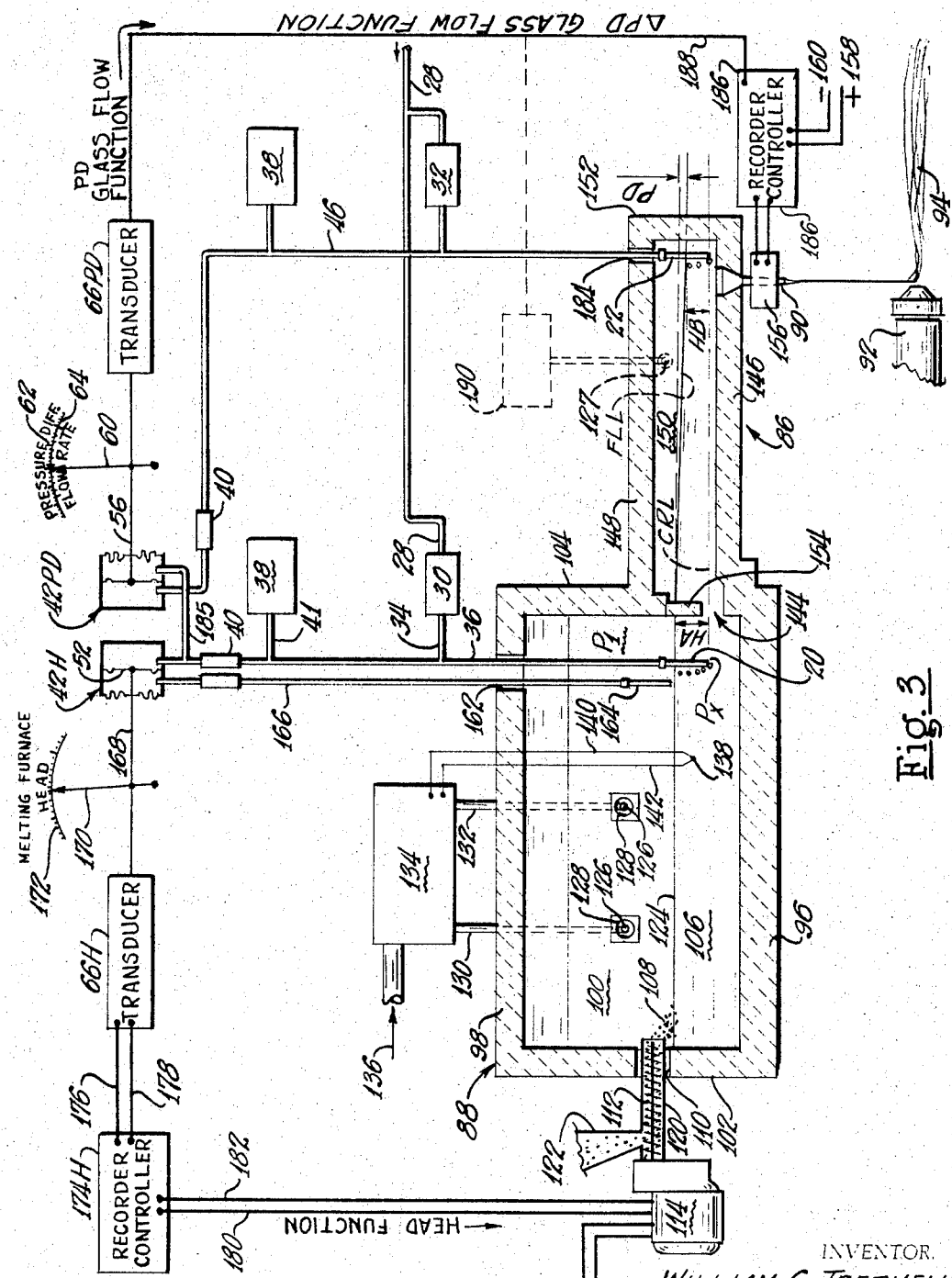
Figure 4:
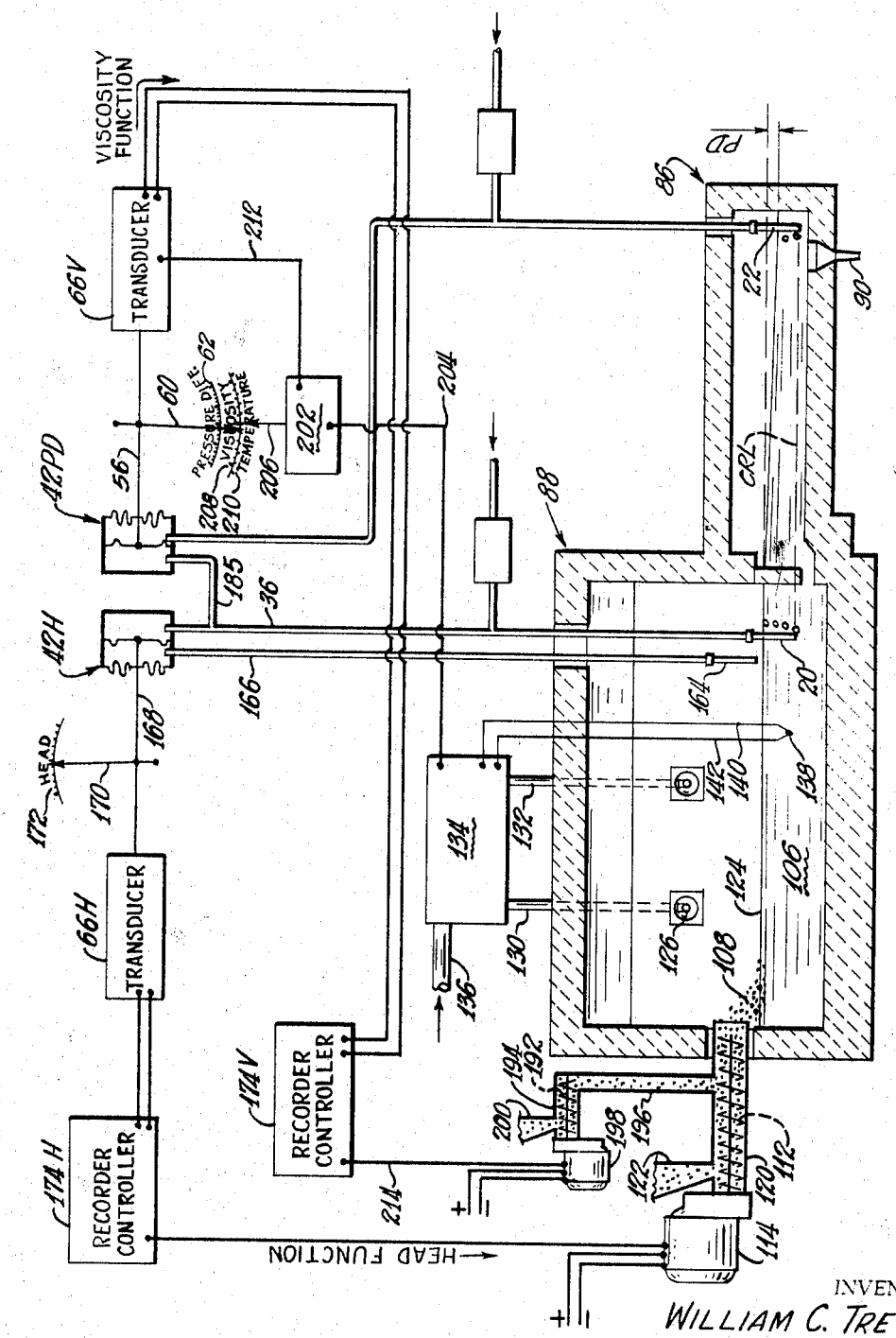

On the drawings.—FIGURE 1 is a schematic illustration showing the present invention applied to the measurement of pressure drop of a liquid across a restriction utilizing two bubbler probes;

FIGURE 2 is a schematic illustration of a broader aspect of the invention as applied to the measurement of pressure drop of a liquid across a restriciton utilizing two surface sensing probes, and optionally producing a function from the pressure differential signal produced;

FIGURE 3 is a schematic illustration of the invention as applied to the measurement of pressure drop and hence flow rate of molten glass across the forehearth of a melting furnace using two bubbler probes, and controlling the level in the melter based on the head signal produced therein; and further controlling the output of the system based on the pressure drop signal produced across the forehearth;

FIGURE 4 is a schematic illustration of the invention as applied to the measurement of pressure drop of molten glass across the forehearth of a melting furnace to control the head of molten glass in the melting furnace, and additionally control the composition of the glass by utilizing the forehearth pressure drop in the nature of a viscosity function; and FIGURE 5 is a schematic illustration of the invention as applied to the measurement of flow of a liquid under pressure across a restriction in a closed conduit, and controlling factors including flow, composition or the like based upon such measurement.

In its broader aspects the invention relates to the measurement of pressure drop of a liquid flowing across a restriction in a conduit. The conduit can be open or closed. The liquid can be under pressure; and the liquid can be hot or cold and of low or high viscosity.

Embodiment 1: Bubbler probes measuring the pressure drop across a restriction; FIGURE 1.—In this aspect of the invention, the head on each side of a restriction is determined using the same horizontal plane in space as a common reference level. The head on the upper side of the restriction is greater. The head on the lower side of the restriction is subtracted from the greater head to provide the pressure drop reading. In accordance with the invention, the reading is converted into a signal that can be reproduced visually as pressure drop, and can be extrapolated into flow rate and flow volume by the use of known constants. Further, the signal can be transduced to produce functions of recording and/or control as will become evident.

Head measurement.—In accordance with this embodiment of the invention two bubbler probes 20 and 22 are utilized. The principle upon which these probes 20 and 22 operate is that the back pressure of a gas bubbling into a liquid through the submerged outlet of a probe is sensitive to head. To provide such head sensitivity it is necessary that the rate of flow of the gas be maintained within a selected range. It has been discovered that within the selected flow rate range, the back pressure is highly sensitive to head but relatively insensitive to viscosity. Therefore, the back pressure can be converted into a pure head signal.

It has been found that at an immersion depth in the range from about 1" to about 2" in molten glass, with a ¼" O.D. tube of about .02" wall thickness, a bubble rate within the range from about 20 to about 30 bubbles per minute provides a highly accurate head signal. By appropriate selection of probe size and bubble rate, head measurements can be made in other liquids and at varying depths.

The back pressure produced on the probe will vary as the level of the liquid varies to produce a highly accurate head signal. It has been found that sensitivities to .0001" are practically possible in a very large vessel of liquid, such as a glass melting tank of 100 or more tons capacity.

The bubbles 24 are issued in discrete form, that is of a maximum diameter less than the probe tip-to-surface distance, so that they will not bridge from the probe outlet to the surface and give a false reading. Signal generation therefore is continual, e.g. as a succession of intermittent pulses caused by the bubble formation.

Bubbles of this diameter are formed as the result of the relationship of viscosity of the liquid, the small size of the probes, and the low pressure at which the gases are supplied to the probe tubes. The gas is passed through each probe from a constant volumetric flow device at pressures commensurate with the head of liquid above the submerged end of the probe to provide an appropriate bubble rate.

In the embodiment shown in FIGURE 1, the high side bubbler probe 20 is immersed in the high side body of liquid A to a depth HA. The reference line CRL is a common reference line or horizontal plane for the tips of the two probes 20 and 22. The body of liquid A has an actual surface or fluid level FL–A.

A restriction R connects the high side body of liquid A to the low side body of liquid B. The restriction R is of constant size. The low side bubbler probe 22 is immersed in the low side body of liquid B to the reference plane CRL. Thus, the tips of the two probes are at the same level so that the differential between their back pressures will provide an accurate measurement of the pressure drop PD across the restriction R. The depth of immersion of the probe 22 is HB indicating head or level in the low side. The low side body of liquid B has a fluid level FL–B.

From the foregoing the pressure drop PD is determined in accordance with the equation: $HA-HB=PD$. This in effect is equal to FL–A minus FL–B to arrive at pressure drop across the restriction R.

Differential pressure detector cell 42 is provided for sensing the difference in pressure between the two probes 20 and 22 and this pressure differential is converted into a signal.

More particularly, gas from a pressure regulator, not shown, at a pressure suitable to meet all conditions, is introduced through main pipe 28 to constant volumetric flow regulator 30 for the high side of the system. From pipe 28 the gas flows through branch pipe 29 and into constant volumetric flow regulator 32 for the low side of the system.

The high side.—From the flow regulator 30, the gas passes through branch line 34 and into main tube 36 and down and out through the immersed outlet of the high side bubbler probe 20 to function in the manner set forth above.

Signal attenuation.—To provide a filtering action for smoothing out the bumps or pressure decreases that occur as each bubble 24 of gas is released from the probe tip, a surge chamber 38 and a restrictor 40 or filter are used. In actual application the volume of the line 46 can function as the surge chamber. These permit the detector 42 to produce a substantially smooth line signal for greater accuracy. Therefore, from the main tube 36, the gas also flows into the surge tank 38 where the pressure differential amplitude of bubble formation is smoothed out to a degree. Connection is made by branch tube 41. The gas also continues up the main tube 36 and through the restrictor 40 where the pulses are attenuated still further. By means of a continuation of the main tube 36, a connection is made into one side of a differential pressure detector cell 42.

The low side.—On the low side of the system, the low side bubbler probe 22 is connected up in essentially the same manner. Thus, gas from the constant volumetric flow regulator 32 flows through branch pipe 44 into main probe tube 46 and down and out through the submerged outlet of the bubbler probe 22. This provides a back pressure for measuring the low side head HB and determining the fluid level FL–B. From the main probe tube 46, the gas flows into surge tank 38 by means of branch tube 48 and on up through the restrictor 40 and into the other side of the differential pressure detector cell 42.

The differential pressure detector cell.—This cell 42 comprises a closed housing 50 having a movable diaphragm 52, supported between flanges 54. The diaphragm 52 and the support flanges 54 are secured to one another in gas-tight relationship, and the flanges are also secured to the housing 50 in gas-tight relation. This divides the housing 50 into two isolated gas-tight compartments.

A signal pick-up arm 56 is connected at one end to the movable diaphragm 52 and extends out of the housing 50 and through a flexible cover 58. A gas-tight seal is provided between the flexible cover 58, the housing 50 and the signal pick-up arm 56. The signal pick-up arm 56 can be connected with a visible indicator needle 60 that moves relative to a pressure differential scale 62. This scale 62 can be extrapolated to a flow rate scale 64 by using known constants of restriction cross sectional area, viscosity of the liquid, etc. This further can be extrapolated to a flow volume scale 65.

Additionally, the signal pick-up arm 56 is connected to a transducer 66 to amplify the pressure drop signal and produce a function. This is indicated by the legend "TO RECORDING AND LEVEL CONTROL FUNCTION."

The unexpected result.—By the arrangement shown, the pressure drop PD, flow rate and flow volume can be observed visually for the convenience of an operator of a given process. Further, the signal can be transduced for functions, including recording and/or control as will become apparent hereinafter.

In this embodiment of the invention, there is no reason to be concerned with the atmosphere above the liquid. It is presumed that the atmosphere is imposed equally on each surface FL–A and FL–B and thus equally imposed on each of the probes 20 and 22 to be balanced out of the system as a constant.

In certain other embodiments of the invention, to be shown hereinafter, atmosphere is balanced out of the system where its fluctuations would be detrimental to the accuracy of pressure drop measurement.

The embodiment of FIGURE 2.—This illustrates the broadest aspects of the invention by disclosing the measurement of pressure drop between two bodies of liquid by sensing the surfaces of the two bodies to determine the difference in level and thus the differential pressure drop between them. Thus, two surface sensing probes 68 and 70 are utilized. These are illustrated schematically and can take the form of electrical contact probes, mechanical contact probes or others such as pneumatic sensing probes which are capable of sensing the surface of a liquid, as distinguished from the submerged probes of FIGURE 1 that detect head. These probes working together are also distinguishable from a U-tube manometer which would sense difference in level by the total head of the high side being balanced against the total head of the low side.

In accordance with this aspect of the invention, signal attenuation equipment commensurate with the degree of fluctuation of the liquid surfaces FL-A and FL-B could be used if desired. These will be apparent to the skilled artisan. A level differentiator 72 is utilized to arrive at a signal representing pressure drop PD between the high side body A and the low side body B.

The level differentiator 72 includes a signal pick-up arm 56 that can engage a visible indicator needle 60 and a transducer 66. The transducer 66 is capable of amplifying the signal to produce a function.

Control.—In accordance with this aspect of the invention, the transduced signal can be converted into control functions as follows:

(1) Maintaining the fluid level FL-A constant on the high side by governing the input of material to the high side. Here it is to be understood that the high side body of liquid has its surface FL-A exposed to the atmosphere. Since restriction R is constant, this will maintain the low side flow constant, presuming constant viscosity of the liquid.

(2) Controlling the outlet rate of the low side by varying the size of the restriction R, such as by a valve 84. By so operating, and with a constant head being maintained on the high side of the system by suitable means, the throughput of the system also can be held constant where viscosity of the liquid could change so that flow through a constant restriction would change.

Constant restriction-constant viscosity.—The supply line or instrumentality 74 feeds into a variable controller 76. The controller 76 is connected to the transducer 66 by means of line 78. The setting of the controller is governed by the amplified pressure drop signal from the transducer 66. If the pressure drop increases, the controller 76 will be slowed so that less material is introduced into the system through the supply line 74. If the pressure drop decreases, the transducer 66 will signal the controller 76 to increase the rate of input. By so operating, the level FL-A will be held constant. Presuming constant viscosity of the liquid and constant restriction size R, the fluid level FL-B of low side body B and thus the body B will be held constant.

Variable viscosity-variable restriction.—This is also illustrated in FIGURE 2 by the dotted outline elements.

In this aspect of the invention the amount of infeed is presumed constant. Therefore the controller 76 is isolated as by an appropriate switch in the line and the connecting line 80 is utilized which leads around to a controller 82 and the valve 84.

In this instance, it is presumed that the viscosity of the liquid can vary, even though the fluid level FL-A remains constant. Therefore if flow is to be held constant, the opening of the valve 84 must be varied commensurate with the viscosity of the liquid. This follows because flow is viscosity-sensitive.

Accordingly, the valve 84 is substituted for the restriction R. This is governed by the variable controller 82. By operating in accordance with this alternate embodiment of the invention, the opening of the valve 84 is adjusted to the instantaneous viscosity of the liquid so that the pressure drop across the system is kept constant. Thus with constant level FL-A on the high side, a constant volumetric flow through the low side will be assured.

Application to a glass melting furnace; FIGURE 3.—In this practical application of the invention, the flow rate across the forehearth 86 of the glass melting furnace 88 is measured by detecting the level differential between two points in accordance with the principles set forth above. In other words, the flow rate of glass from the melting chamber is determined by simultaneously detecting the level in the melter, the high side, and at the outlet of the forehearth, the low side. Thus, the forehearth is considered as the restriction across which the molten glass flows. By converting the pressure drop signal into a function, the infeed of batch materials into the melter can be controlled and thus the level in the melter can be held constant.

Molten glass from the melting zone of the furnace 88 flows to and through the forehearth 86 as a shallow layer, for delivery. In this instance, the forehearth 86 is equipped with a delivery bushing 90 for producing wool fibers. Accordingly, a high pressure jet 92 is schematically illustrated for producing fibers 94. Other outfeed instrumentalities as will be evident to the skilled artisan can be controlled by the present invention however.

More particularly, the glass melting furnace 88 includes a refractory floor 96, a refractory roof arch 98, refractory side walls 100 and refractory end walls 102 and 104. The glass melting furnace 88 contains a pool of molten glass 106. The pool of molten glass 106 is developed by feeding blended batch materials 108 in through an opening 110 in the end wall 102. A primary screw feeder 112 is powered by a variable speed drive 114, supplied with power through lines 116 and 118. The primary feeder 112 operates in an elongated housing 120 into which powdered glass batch materials are suitably fed by gravity from a hopper 122. The elongated housing 120 extends into the opening 110 of the left hand end wall 102. Operation of the feeder 112 in response to a suitable signal, developed as will be later described, causes all of the powdered glass batch materials 108 to be fed into the furnace 88 at an appropriate rate in order to keep the level 124 thereof constant.

At this point it is to be stated that the proportional mixing of the several individual batch ingredients is effected by conventional means and that accordingly the viscosity of the melt may vary at least slightly according to known experience in this art. No attempt is made by this aspect of the invention to control the viscosity of the body of molten glass 106. Here, the emphasis is on level control only of the body 106 and slight changes of viscosity within commercial standards are tolerated. Any viscosity changes are taken care of at the outlet end of the system by varying the heat of the bushing 90 and/or the heat in the forehearth 86 for fine control of the process.

Although it is within the scope of the invention to vary the firing level in the forehearth and for that matter in the melter proper, this is not recommended from a practical point of view. Thus, it has been found that there is an optimum firing level for greatest refractory life both in the melter and in the forehearth. Therefore, good technique requires that the optimum firing level be maintained. Therefore, this aspect of the invention concerns itself with temperature control at the bushing so that the firing rate can be maintained at an optimum level and refractory life thereby prolonged.

In the present constant level embodiment the signal developed as the result of measurement of the pressure drop between the outlet of the glass melting tank 88 and the outlet of the forehearth 86 is utilized to regulate the variable speed drive 114 to supply the entire batch materials to the glass melting furnace 88 as required, in order to keep the fluid level 124 of the body of molten glass 106 constant, no matter what the output viscosity of the molten glass from the melter proper might be.

The atmosphere above the pool of molten glass 106 is suitably gas or oil fired. Alternately, electricity can be used by means of submerged electrodes. Burners 126 are inserted into ports 128 to project flames across the pool of molten glass 106, preferably at the optimum firing rate mentioned to melt the blended batch materials 108. The burners 126 are supplied with pressurized fuel through pipes 130, 132, etc. in turn connected to a thermocouple-controlled firing regulator 134 connected to a thermocouple 138 by lines 140 and 142. Primary fuel is introduced into the regulator 134 through a main supply pipe 136. In the regulator 134, the fuel is manifolded out through the pipes 130 and 132 to the burners 126 as determined by the thermocouple 138. The fuel is supplied commensurate with the optimum requirements of the particular furnace.

The right hand end wall 104 of the furnace 88 is provided with an opening 144 that connects into the forehearth 86. Only one forehearth is illustrated; however, it is common practice for a single glass melting furnace to employ a plurality of forehearths. The invention therefore is applicable to use with one or several forehearths.

The forehearth 86 is essentially an elongated, open-top channel and includes a refractory bottom 146, a refractory roof arch 148, refractory side walls 150 and a refractory end wall 152. Although the roof arch 148 appears to cover the forehearth, it is usually adequately vented so that a relatively quiescent atmosphere exists in the forehearth as compared to the more intense atmosphere which exists in the melting furnace 88. Accordingly, for practical purposes the atmosphere of the forehearth 86 need not be taken into consideration in the present system.

A strainer block 154 is positioned in the mouth of the forehearth 86 to hold back any floating particles from the effluent molten glass. The strainer block 154 also effectively isolates the atmosphere of the melting furnace 88 from the atmosphere of the forehearth 86, further contributing to the quiescence in the forehearth.

The flow of molten glass across the length of the forehearth 86 is effected by gravity and the pressure drop PD is illustrated by the slant of the forehearth liquid level FLL, designating the surface of the glass within the forehearth. This is shown exaggerated for the purpose of more clearly illustrating the invention. Practically, a pressure drop across the forehearth in the nature of ½″–1½″ will be realized.

The bushing.—At the outlet end of the forehearth 86, the bottom 146 is provided with a feed bushing 90. This is suitably of a tubular configuration. The bushing 90 can be made of high temperature-resistant metal to withstand the molten glass. For purposes of the present illustration, the bushing 90 is shown as having a heater 156 positioned in surrounding relationship to it. The heater 156 is electrically powered and wires 158 and 160 supply power to a suitable heating element within the unit. By this arrangement, the bushing 90 has a fixed feed opening. However, by means of the heater 156, the viscosity of the glass passing through the bushing can be reduced by activating the heater so that flow control is provided. This causes the bushing to function as a variable valve in effect.

The problem of the prior art. Even though a constant level is maintained in the glass melting furnace 88, several changeable factors exist in the practical, very large quantity melting of glass so that the rate of flow through the fixed size bushing 90 will vary. One of the most important factors is the viscosity of the glass which, of course, is both composition and temperature dependent. Thus, in this embodiment the temperature of the bushing is adjusted to compensate for minor viscosity fluctuations and thereby, through fine control, maintain the flow through the bushing 90 constant.

It is at this point that the invention comes into play. Therefore, all aspects of the invention will now be set forth in detail, including the manner in which application is made to the fiber forming operation illustrated. It will, however, be evident that many other applications of the principles of the invention will be apparent to those skilled in the art.

The invention in detail: The flow detector system. The right-hand end of the glass melting tank 88 is provided with a small opening 162, positioned above the glass level 124. The high side bubbler probe 20, in the form of a high temperature-resistant metal tube, is extended through the opening 162 and projects vertically downwardly with the open end immersed below the level 124 of the pool of molten glass 106. The bubbler probe 20 is fixed in space so that the open end is at the common reference line CRL. This is also the depth to which the low side bubbler probe 22 is immersed, at the outlet end of the forehearth 86. The high side bubbler probe 20 is supplied with a constant volumetric flow of a suitable gas to provide a bubble rate in the range from about 10 to about 30 bubbles per minute to sense the high side head of glass HA in the melting furnace 88. For this purpose, a supply pipe 28 carrying gas from a suitable pressure regulator, not shown, feeds into a constant volumetric flow controller 30, thence through branch tube 34 to the main tube 36 to which the bubbler probe 20 is connected. A branch tube 41 connects into surge tank 38 where back pressure pulses from bubble formation are partially attenuated. A restricter 40 is suitably incorporated into the main tube 36 for further signal attenuation. From the restricter 40 the gas passes up to the differential pressure detector cell 42H.

Depending upon firing conditions in the furnace, caused by the actions of the burners 126, the atmosphere above the pool of molten glass 106 will be subjected to slight pressure fluctuations. Therefore, an atmosphere sensing probe 164 of high temperature-resistant metal is inserted through the opening 162. The atmosphere probe 164 is connected to the other side of the differential pressure detector cell 42H by means of tube 166, which can include a flow restricter 40 for pulse attenuation if desired.

Melting furnace head signal.—A head or level signal pick-up arm 168 is connected to the movable diaphragm 52 of the cell 42H and can engage a head indicator needle 170. A melting furnace head or level scale 172 is provided. Additionally, the signal pick-up arm 168 is connected to a transducer 66H. By this arrangement, head can be ascertained visually, and additionally the signal is amplified by the transducer 66H for functions of recording and control. The transducer 66H is provided with its own suitable power supply for appropriate amplification of the signal from the pick-up arm 168.

A recorder-controller 174H is connected to the transducer 66H by lines 176 and 178. Further, the recorder-controller 174H is connected to the variable feeder 114 by means of lines 180 and 182. The primary feeder 112 is thereby directed to feed blended batch materials 108 into the pool of molten glass 106 to keep the level 124 constant, as directed by the back pressure of the bubbler probe 20. It will be evident that the atmosphere is subtracted from the signal imposed on the bubbler probe 20 by means of the atmosphere probe 164 and the pressure detector cell 42H. Thus a pure head signal is produced for level control. The pressure $Px$ required to form a bubble at the tip of the probe 20 is sensed by the differential pressure detector cell 42H. The furnace pressure $P_1$ is also sensed by the cell 42H through atmosphere probe 164. Since $Px=HA+P_1$, the head of glass $HA=Px-P_1$. Note that $P_1$ opposes $Px$ on the diaphragm 52 of the cell 42H so that the net displacement of the diaphragm (the output of the cell 42H) equals $Px$ minus $P_1$. This equals HA (the desired head measurement). This arrangement automatically compensates the system for any internal pressure fluctuations of the furnace 88, thus avoiding an upset in the level system if for any reason furnace pressure should suffer an upset.

The forehearth probe tube 22.—The low side bubbler probe 22 also consists of a high temperature-resistant metal tube and is immersed in the molten glass at the outlet end of the forehearth 86 to the same common reference line CRL. Thus the differential back pressure between the two probes 20 and 22 will indicate the pressure drop across the forehearth. The depth of immersion of probe 22 is HB and that of probe 20 is HA. Therefore the equation $HA-HB=PD$. PD is the legend for pressure drop.

The low pressure side bubbler probe 22 is suitably inserted through an opening 184 in the refractory roof arch 148 of the forehearth 86. Suitable support means is provided to place the outlet at the CRL line. The probe 22 is supplied with suitable gas at a pressure to meet all conditions by a constant volume flow controller 32. The back pressure on this gas will vary with the head at the outlet end of probe tube 22. A bubble rate of about 10 to about 30 bubbles per minute in accordance with the principles of the invention is utilized. A surge tank 38 and restricter 40 are connected to the main probe tube 46 for back pressure blip attenuation. The forehearth probe 22 is connected into one side of a differential pressure detector cell 42PD. The other side of the cell 42PD receives the melter head signal through a cross tube 185. A pressure drop signal pick-up arm 56 extends out of the cell 42PD and can engage an indicator needle 60. The needle 60 works relative to a pressure drop scale 62. The signal pick-up arm 56 is also connected to a transducer 66PD. The transducer 66PD is connected to a recorder-controller 186 by line 188. The controller 186 adjusts the power from lines 158 and 160 into the bushing heater 156.

Operation.—The pressure drop signal from the cell 42PD causes the controller 186 to adjust the temperature of the bushing heater 156 and thus levels out the flow through the bushing 90 since the viscosity of the glass is temperature-sensitive.

Extended scope.—In this embodiment of the invention the bushing temperature and/or the temperature of the forehearth can be varied commensurate with the viscosity of the glass. Thus, as shown in dotted outline, a controller 190 can be used to control the burner 127 placed in the forehearth 86. This would control the temperature level within the forehearth. Actually the two controllers 186 and 190 could be used in conjunction if desired.

As mentioned above, the change in temperature of the bushing 90 causes it to function in the nature of a variable valve. Therefore within the still further extended scope of the invention, it is to be understood that the bushing can be built with a variable orifice and the controller 186 would function to vary the size of the orifice commensurate with the instant viscosity of the glass passing through the forehearth as indicated by the PD pressure drop signal HA minus HB.

In the extended scope of the invention, the level can be measured at more than the two points shown in FIGURE 3. Thus the pressure drop and flow rate can be determined by placing the forehearth probe 22 at any point along the forehearth 86.

Further, instead of being placed in the melting furnace 88, the high side probe 20 can be placed somewhere in the forehearth. Substantially any arrangement can be used so long as a pressure drop is sensed and converted into a function.

This aspect of the invention illustrates the manner in which the temperature of a liquid can be controlled. Other aspects of the invention will include control of composition by proper correlation of pressure drop with viscosity and temperature.

Viscosity-composition control; FIGURE 4.—The prior embodiment of the invention was related to level control only in the glass melting furnace 88. Within the extended scope of the invention composition control can be effected. This is made possible by the fact that for every glass composition there is a certain viscosity at a certain temperature. In the present embodiment, temperature is held constant. Further, flow through a fixed orifice is a function of the viscosity of the liquid. Therefore, change in pressure drop is equivalent to change in viscosity at constant temperature, e.g. composition.

Therefore, by employing the principles developed, composition can be controlled. In accordance with this aspect of the invention, pressure drop is utilized in the nature of a function of viscosity to govern infeed of a viscosity-influencing ingredient.

FIGURE 4 illustrates a glass melting furnace 88 having a pressure drop system of the invention associated with a thermocouple 138 and appropriate control mechanism connected thereto. The signal attenuation surge tanks and restricters are omitted for simplicity, having been previously described.

The glass melting furnace 88 is of the same general configuration as in FIGURE 3, and includes a forehearth 86 and a constant size feed-out bushing 90. Here however the bushing does not have the temperature controlled as in FIGURE 3, because here the viscosity, to wit: composition is held constant.

On the input side of the melting furnace 88, there is also an alteration of the batch feed equipment, although the same type of primary feeder 112 is utilized, with its housing 120, supply hopper 122, variable rate drive 114, etc.

The pool of molten glass 106 is developed by the primary feeder 112 supplying all blended batch materials 108 at an appropriate rate to hold the level 124 constant. In this aspect of the invention, it will be understood that the materials from the primary hopper 122 can be considered as having a relatively lesser influence on the viscosity of the molten glass 106. The primary feeder is controlled by the level mechanism in the melting furnace to hold the melter level 124 constant. This will be developed fully later and with a fixed orifice in the bushing, provides a constant theoretical pressure drop across the forehearth 86.

To control viscosity of the molten glass 106, the alteration is provided in the form of a secondary feeder 192 which is connected to feed into the primary feeder 112. The secondary feeder 192 operates in an elongated housing 194 which is connected by a chute 196 into the primary housing 120 forwardly of the primary hopper 122. The secondary feeder 192 is also powered by a variable speed drive 198. The viscosity-influencing ingredients are supplied to the secondary feeder from a hopper 200.

Thus, a blending operation is provided in accordance with this aspect of the invention, depending upon the proportionate rate at which the secondary feeder 192 works relative to the primary feeder 112.

Constant temperature system.—The atmosphere above the pool of molten glass 106 is suitably fired by burners 126. The burners 126 are supplied with fuel via pipes 130, 132, etc. in turn connected to a thermocouple-controlled firing regulator 134. Pressurized fuel is introduced into the regulator 134 through a main supply pipe 136. In the regulator 134, the fuel is manifolded out through the lines 130, 132 as required for firing conditions of the particular furnace.

A thermocouple 138 is immersed in the molten glass 106 and is connected to the firing regulator 134 by lines 140 and 142. From the regulator 134, the thermocouple 138 is also connected to a temperature control 202 by a line 204. The temperature control 202 is equipped with a movable temperature needle 206 forming part of the thermocouple control system. By this arrangement, the needle 206 can be set to establish and hold a selected constant temperature level in the pool of molten glass 106. By a cross connection to the pressure drop mechanism, as will be developed later, control of infeed of the viscosity influencing ingredient is provided.

The pressure drop-viscosity detector system.—At the outlet end of the glass melting furnace 88, a high side bubbler probe 20 and its companion atmosphere sensing probe 164 are utilized, in the manner set forth for FIGure 3. The immersed probe 20 is connected into one side of the differential pressure detector cell 42H and the atmosphere probe 164 is connected into the other side of the cell. This produces a pure head signal from the melting furnace head signal arm 168. The transducer 66H feeds the recorder-controller 174H which in turn establishes the rate of operation of the variable drive 114 for the primary feeder 112. By this arrangement the level 124 in the glass melting furnace 88 is kept constant.

The second bubbler probe 22 is the low side bubbler probe, positioned at the down-stream end of the forehearth 86. This uses the same common reference level CRL as the probe 20. The low side bubbler probe 22 is connected into one side of a differential pressure detector cell 42PD and the high side probe 20 is connected into the other side of the cell by means of a branch line 185. Thus pressure drop between probes 20 and 22 is detected by the cell 42PD.

A pressure differential signal arm 56 extends out of the cell 42PD and engages a visual indicator needle 60 that moves relative to a pressure drop scale 62, further extrapolated to a viscosity scale 208 and a temperature scale 210. The pressure drop signal arm 56 also extends to a transducer 66V, designating the viscosity side of the system. A cross connection is established between the temperature controller 202 and the transducer 66V by means of line 212. When the pressure differential needle 60 and the temperature needle 206 coincide, a null point is established in the system to signify proper viscosity in the bath of molten glass 106 and thereby hold the feed rate of the viscosity influencing ingredient from the secondary feeder 192 constant. However, when the pressure drop (viscosity) drifts away from temperature, which is held constant, a change in the rate of feed of the viscosity influencing ingredient is required. Thus the transducer 66V is connected through a recorder controller 174V (transmitter) to the variable drive 198 of the secondary feeder 192 by means of line 214.

Operation.—All of the glass batch materials are fed into the glass melting furnace 88 by a primary feeder 112. These are melted by means of the heat of the fuel supplied by burners 126. The thermocouple 138 regulates the burners to keep the temperature of the pool of molten glass 106 constant.

The level 124 in the glass melting furnace 88 is held constant by the primary bubbler 20 directing the primary batch feeder 112 to feed at a rate to hold the level 124 constant. The molten glass flows out of the furnace 88 and across the forehearth 86 producing a pressure drop between the two probes 20 and 22. The bubbler probes 20 and 22 continually, that is in a successive, individual pulse manner, monitor the pressure drop while the atmosphere probe 164 substracts atmosphere fluctuations from the system to provide a pure pressure drop signal.

When the viscosity (pressure drop) and temperature are in correct correlation with one another, glass composition is constant and the proportion of viscosity-influencing ingredient fed by the secondary feeder 192 will remain constant. However, should viscosity drift away from temperature, a change composition is indicated. Instantly an amplified signal from the transducer 66V directs the secondary feeder 192 to increase or decrease the proportion of viscosity-influencing ingredient as necessary.

Relative to the glass melting furnace 88 shown in this embodiment, it is to be understood that some lag may be encountered between the viscosity signal developed across the foreheath and the batch ingredients being fed in at the other end. The showing of FIGURE 4 is therefore schematic. It will accordingly be understood that an optimum location of the thermocouple 138 and the pressure drop system 20, 22 will make it possible to instantly control viscosity of the melt for purposes of holding the outfeed constant, to a forming operation.

Further extension of the invention.—This concludes the description of the open conduit aspects of the invention. However, further applications are encompassed and include the measurement of pressure drop across a restriction within a closed conduit or between two independent vessels under pressure and under either dynamic conditions of flow or static conditions of no flow. Some of these are developed below.

Pipes or conduits; FIGURE 5.—Here, pressure drop can be determined and a signal developed and converted into a function. This can include the setting of a valve, or the control of a pump, or the control of a heater for viscosity regulation, or the control of a proportioning means for viscosity-influencing ingredient, or the like.

According to FIGURE 5, a pipe or conduit 216 is employed to carry a liquid material 218 in a flow direction 220. First, let it be presumed that the pressure drop only across the restriction R is to be determined. A high side bubbler 20 is inserted into the system above the restriction R and is connected to one side of the differential pressure detector cell 42PD. The low side bubbler probe 22 is inserted into the system on the other side of the restriction R and connected to the other side of cell 42PD. The signal produced by the cell 42PD is a true pressure drop across the restriction R.

Function: Pump control.—Let it be presumed that the electric pump P fluctuates due to change in line voltage and head of liquid supplied to it, or other factor as in any practical application. Yet it is desired to keep the flow rate through the system constant and thus the pressure drop across the restriction R constant. To effect this, the transducer 66PD is coupled to a recorder controller 174PD and this in turn to the pump P. By so operating, any change in pressure drop across the restriction R will instantaneously cause the pump P to speed up or retard so that constant pressure drop is maintained. Constant pressure drop equals constant flow rate.

Function: Viscosity control.—In this different situation, let it be presumed that pump P is a constant throughput unit made possible by means of appropriate control mechanism. However, because of fluctuations of composition, viscosity, temperature or other of the liquid 218, the flow rate across a fixed restriction would vary. Therefore, a variable valve V is installed into the system as shown in dotted outline. The control from the recorder-controller 174PD is accordingly directed into the valve V to vary the size of the opening thereof and thus keep the pressure drop, and thus flow rate, and thus flow volume constant between the high side of the system and the low side of the system.

Function: Viscosity-composition control.—By employing a thermocouple 138 and appropriate control mechanism and cross connection to the pressure drop transducer 66PD, and utilizing the principles developed relative to FIGURE 4, composition of the liquid material 218 can be controlled. Thus, an ingredient blending system 222 supplied by a primary pipe 224 and a secondary pipe 226 for vehicle, and viscosity-influencing ingredient respectively would be included in the system. This would be actuated by the controller 174PD as the result of the viscosity function.

The foregoing description presumes that the liquid 218 can tolerate a small amount of an appropriate bubbler gas. However, it will be necessary that the gas emitted from the probe tubes 20 and 22 be not only under sufficient pressure to overcome the hydrostatic head of the liquid 218 as imposed by the pump P, but also under enough additional pressure to produce a constant flow of discrete bubbles at a selected rate.

In the extended scope of this aspect of the invention, measurement of level differential between independent vessels is possible. In the case of closed vats, an atmosphere probe would be used for each bubber to balance out change in atmosphere caused by input of bubbler gas. Thus, within the scope of the invention both closed and open conduits or container operations will be evident.

Practical consideration.—In a practical embodiment of this invention, the probe tubes comprised high-temperature resistant metal of about ¼″ O.D. and having a wall thickness of about .02″. With the lower ends of the probe tubes immersed from about 1″ to about 2″ below the surface of molten glass, clean air was delivered at a rate to form approximately 10 to 30 discrete bubbles per minute. Signal generation was therefore continual, as a succession of intermittent pulses. The bubbles were of a diameter less than the distance between the outlet of the probe tubes and the surface of the glass so that the bubbles did not bridge the tip-to-surface distance to give a false reading. In the extended scope of the invention, the size and wall thickness of the probe tubes is not to be limited. Thus a probe of ⅛″ O.D. tubing with a .02″ wall thickness also could be used. Further, a ⅜″ O.D. tube could be used, depending on the particular installation conditions. The probe immersion depths of 1″ to 2″ demonstrate versatility of the invention for measuring shallow glass flow conditions as in the forehearth of a glass melting furnace. However, measurements in deeper zones can be made with a high degree of accuracy. Thus deeper immersion depths also make it possible to apply the invention to deep tanks for measuring level differences between them.

When other liquids having substantially different viscosity characteristics from glass are measured, bubble rates appropriate to the measurement will become apparent through practical study.

Single bubble; constant size.—In the broadest aspects, the present concept is applicable to a single bubble hanging on or developed at the end of a single level probe. This is based on the fact that a given pressure will be required to produce a bubble of constant size at given head. By holding the bubble size constant, change in back pressure becomes a reflection of head as established hereinbefore. This approach is feasible where a constant stable pressure is maintained above the liquid.

The single bubble aspect; single bubble of varying size.—Also the bubble can vary in sizes if the back pressure on the bubble is held constant. The size of the bubble will be a reflection of the back pressure or depth being measured. The measuring device could be mechanical, electrical or optical.

The present invention provides an ideal medium for developing a signal to be fed into a digital computer for regulation of variables in a glass melting or analogous heat-softenable material processing operation. In fact this can include firing temperature, control of batch ingredients, level control, and others for adjustment and control of viscosity, composition, head, etc. thus stabilizing these as constants for highest quality output at optimum production efficiencies. By so operating, the variables in the system are reduced to substantial constants; these are effectively cancelled from the system for improved productivity.

Inherent in the present invention is also the establishment of a selected pressure drop, pump pressure, composition or other. Thus, the indicator needles can be moved to a predetermined setting and held there until the associated mechanism stabilizes the system at that level.

The control loop shown in the drawings extending from the differential pressure detector cells through the transducers to the recorder-controllers can be electrical or pneumatic. The recorder-controller can be a combined transmitter unit as shown, or can be two separate units.

In the extended scope of the invention, it will be evident that temperature can also be controlled by holding the composition of a liquid constant and adjusting the temperature so that the resultant constant viscosity produces a constant pressure drop across the restriction under consideration.

It is to be understood that the invention is not limited in its application to the particular constructions and arrangement of parts described, since the invention is capable of other embodiments and of being practiced and carried out in various ways.

I claim:

1. In apparatus for controlling the composition of molten glass in a glass melting furnace and thus viscosity of the molten glass, the furnace having a melting chamber connected to the forehearth, and the forehearth having an outlet, and a restricted passage connecting the melting chamber and the forehearth, primary feeder means for introducing glass forming materials to a temperature sufficient to melt said glass forming materials into the melting chamber, means for heating said materials to form a body of molten glass, secondary feeder means for introducing viscosity influencing glass ingredient into said glass forming materials, heat control means for holding the temperature of said glass in the melting chamber substantially constant, first bubbler means for bubbling a stream of gas into the molten glass in the melting chamber at a rate to produce a back pressure on the stream reflecting head of molten glass, above a common reference level, second bubbler means for bubbling a stream of gas into the molten glass near the outlet of the forehearth at a rate to produce a back pressure in the stream reflecting head of the molten glass above said common reference level, differential pressure detector means for detecting difference between said back pressures, connecting means connecting said first and second bubbler means to said differential pressure detector means, means interconnecting said heat control means and said differential pressure detector means, and means connecting said differential pressure detector means to said secondary feeder means to vary the feed rate of said viscosity influencing glass ingredient and thereby control the composition and viscosity of said molten glass in accordance with the pressure drop across the forehearth.

2. In apparatus for controlling the flow of glass through a melting furnace and thus the level, the furnace having a melting chamber connected to a forehearth and the forehearth having an outlet, and a restricted passage connecting the melting chamber and the forehearth, feeder means for introducing glass forming materials into the melting chamber in response to a control signal to maintain the glass level constant, means for heating said materials to form a body of molten glass, first bubbler means in the glass melting chamber for bubbling a stream of gas into the molten glass at a rate to produce a back pressure on the stream reflecting head of molten glass, above a common reference level, second bubbler means in the forehearth for bubbling a stream of gas into the molten glass at a rate to produce a back pressure on the stream reflecting head of molten glass above said common reference level, differential pressure detector means having two opposed sides for detecting difference between said bubbler back pressures and producing a signal representing difference in level between said melting chamber and said forehearth, means connecting said bubbler means to respective sides of said differential pressure detector, and means connecting said differential pressure detector to control said feeder means to maintain the glass level in the melting chamber constant in accordance with said signal.

3. The invention of claim 2, including means for adjusting the effective flow through said forehearth outlet to maintain a constant pressure drop between said melting chamber level and said forehearth level.

4. The invention of claim 2 including means for controlling said heating means in said melting chamber to provide a substantially constant heat input for melting glass.

5. The invention of claim 3, wherein said forehearth outlet is of constant size and said means for adjusting flow therethrough comprises a heater effective to reduce the viscosity of molten glass flowing therethrough, and means connecting said differential pressure detector to said heater for controlling the temperature thereof.

6. The invention of claim 2, including heating means in said forehearth to adjust the temperature of glass therein, and means connecting said differential pressure detector to said heating means for controlling the heat output thereof.

7. In a process of operating a glass melting furnace having an input end, a melting chamber controllable means for feeding a viscosity-influencing glass ingredient into the total glass-forming materials fed into the melting chamber, a forehearth connected to the melting chamber by means of a restriction, and the forehearth having an outlet, and controllable means for removing glass from the forehearth, the steps of adding glass forming materials to the melting chamber at the input end at a rate to maintain a constant pressure drop between the melting chamber and the forehearth, heating the glass forming materials to form a body of molten glass in the melting chamber and holding the temperature of the molten glass substantially constant, detecting the head of molten glass in the melting chamber by bubbling a constant flow volume stream of gas into the molten glass at a common reference level, to develop a back pressure on the stream reflecting head of molten glass in the melting chamber above the common reference level, holding the level of molten glass in the melting chamber substantially constant by adding glass forming materials as molten glass is removed, flowing the molten glass through the restriction and across and out of the forehearth, detecting the head of molten glass at the outlet of the forehearth by bubbling a constant flow volume stream of gas into the molten glass at the outlet, and at said common reference level, to develop a back pressure on the stream reflecting head of molten glass at the outlet, above the common reference level, subtracting the head at the outlet of the forehearth from the head of molten glass in the melting chamber to provide a signal representing pressure drop across the forehearth, and adjusting said controllable feed means for said glass forming materials and for said viscosity-influencing ingredient and said controllable means for removing glass by said signal to maintain the pressure drop constant.

References Cited
UNITED STATES PATENTS

| | | | |
|---|---|---|---|
| 1,246,764 | 11/1917 | McCoy | 65—160 |
| 2,866,838 | 12/1958 | Paxton | 65—29 X |
| 3,052,126 | 9/1962 | Laas | 73—407 |
| 3,200,971 | 8/1965 | Trethewey et al. | 73—407 X |

S. LEON BASHORE, Primary Examiner

ROBERT L. LINDSAY, Assistant Examiner

U.S. Cl. X.R.

65—161, 162, 164, 335; 73—302